(12) United States Patent
Nagasawa

(10) Patent No.: US 6,901,349 B2
(45) Date of Patent: May 31, 2005

(54) ANALYSIS APPARATUS AND ANALYSIS METHOD

(75) Inventor: Jun Nagasawa, Chiba (JP)

(73) Assignee: SII NanoTechnology Inc., Chiba (JP)

( * ) Notice: Subject to any disclaimer, the term of this patent is extended or adjusted under 35 U.S.C. 154(b) by 86 days.

(21) Appl. No.: 10/644,717

(22) Filed: Aug. 20, 2003

(65) Prior Publication Data

US 2004/0059507 A1 Mar. 25, 2004

(30) Foreign Application Priority Data

Aug. 30, 2002 (JP) .......................... 2002-253241

(51) Int. Cl.[7] ...................... G21C 17/112; G01N 27/18; G06F 19/00
(52) U.S. Cl. .......................... 702/183; 73/23.2; 703/99; 703/103
(58) Field of Search ............................. 702/42, 45, 99, 702/103, 104, 130, 182, 183; 700/31; 73/1.03, 23.2

(56) References Cited

U.S. PATENT DOCUMENTS 5,025,653 A * 6/1991 Schuldt ...................... 73/23.2
6,622,104 B2 * 9/2003 Wang et al. .................. 702/99
6,782,332 B2 * 8/2004 Seip et al. ................... 702/103

* cited by examiner

Primary Examiner—John Barlow
Assistant Examiner—John Le
(74) Attorney, Agent, or Firm—Adams & Wilks

(57) ABSTRACT

An analysis apparatus has a measurement head for measuring characteristics of a sample, a calibration conditions file comprising at least one calibration condition obtained by carrying out device calibration for the measurement head in advance, and a measurement head controller for designating one of the calibration conditions within the calibration conditions file. Measurement sequence data comprised of a sequence of measurement steps has measurement conditions for carrying out measurements by the measurement head and the calibration conditions designated by the measurement head controller. A measurement device refers to each measurement step of the measurement sequence data and carries out measurement after inputting the measurement conditions and the calibration conditions for each measurement step to the measurement head.

4 Claims, 3 Drawing Sheets

FIG.2

MEASUREMENT SEQUENCE

| STEP NUMBER | MEASUREMENT SAMPLE CONTAINER NUMBER | REFERENCE SAMPLE CONTAINER NUMBER | TEMPERATURE PROGRAM FILE NAME | CALIBRATION CONDITIONS FILE NAME |
|---|---|---|---|---|
| (1) | 1 | 61 | Temp Prog 1 | Calib 1 |
| (2) | 2 | 62 | Temp Prog 2 | Calib 2 |
| (3) | 3 | 63 | Temp Prog 3 | Calib 3 |
| (4) | 4 | 64 | Temp Prog 4 | Calib 4 |

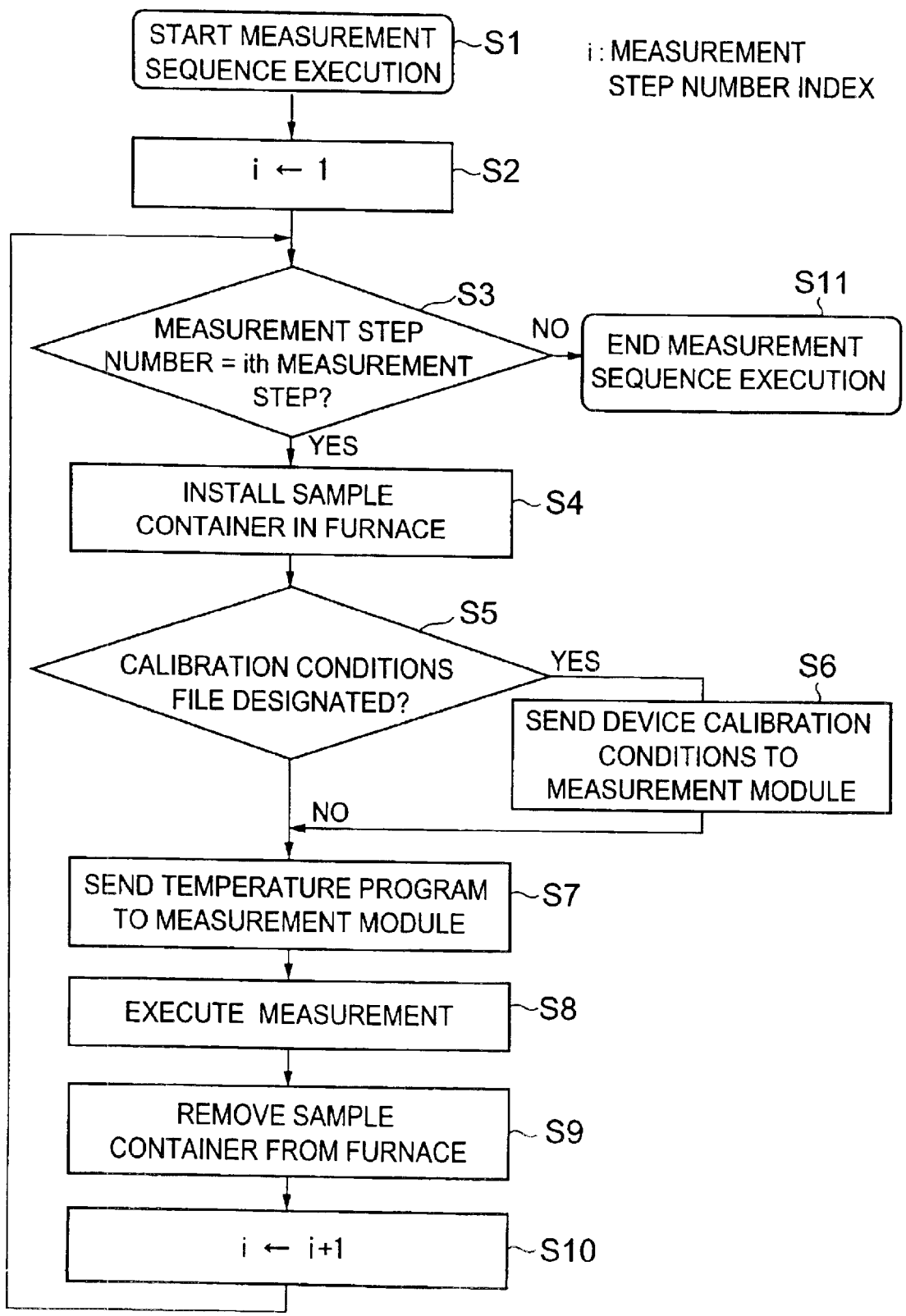

ANALYSIS APPARATUS AND ANALYSIS METHOD

BACKGROUND OF THE INVENTION

1. Field of the Invention

The present invention relates to an analysis apparatus such as a thermal analyzer, and in particular relates to an analysis apparatus for consecutively measuring a plurality of samples.

2. Description of Related Art

Measurement signals measured by an analysis apparatus include errors caused by various factors. It is therefore necessary to calibrate for errors included in measurement signals by carrying out device calibration using reference samples or reference materials in order to obtain a more precise measurement signal. For example, when carrying out measurements for temperature signals using a thermal analyzer for measuring properties of a sample while changing the temperature, error factors exist such as errors due to thermocoupling itself when measuring temperature, errors due to electrical circuit systems, and errors due to changes in heat transfer conditions due to differences in the type of sample container, measurement atmosphere or heating rate. As a result, in temperature calibration of a thermal analyzer, melting points are measured using one type or a plurality of types of high-purity metals as a reference material as the melting points of the metals is already known, calibration values are obtained from differences in documented values, and temperature signal calibration is carried out.

The content of these error factors changes according to measurement conditions but there are also error factors, the content of which do not change due to measurement conditions, error factors the content of which changes, and error factors that are themselves included as part of the conditions. Of the error factors occurring in the temperature signal of the aforementioned thermal analyzer, cases where the type of sample container, the measurement atmosphere and the heating rate themselves are changed as measurement conditions in line with the objective of the measurements. Therefore, in order to obtain a high-precision measurement signal, it is necessary to carry out device calibration under the same conditions as for actual measurements. However, the procedure for carrying out device calibration for the analysis apparatus is complex and time-consuming and it is difficult to carry out device calibration prior to every measurement.

Therefore, in related analysis apparatuses, calibration conditions obtained by carrying out device calibration under a plurality of types of measurement conditions in advance are saved in advance. Then, prior to starting measurement, means are provided for selecting calibration conditions appropriate for the measurement conditions from the saved calibration conditions.

Further, with a thermal analyzer, the influence of the type of sample container on the measurement precision is substantial amongst the aforementioned error factors. Means are therefore provided to preset calibration conditions for each type of sample container in advance, select the type of sample container at the condition setting prior to measurement, and automatically select preset calibration conditions.

When measurements are carried out for a plurality of samples using an autosampler etc., individual measurements are carried out under different measurement conditions and it is necessary to use calibration conditions in line with each of the measurement conditions. With related analysis apparatuses, when a plurality of measurements are carried out there are no means for designating different calibration conditions for each measurement, and a single calibration condition designated before starting is used in all measurements that are carried out consecutively.

Further, with thermal analyzers having means for automatically selecting calibration conditions preset according to the type of sample container, because the same calibration conditions can be used if the type of sample container is the same, it is not possible to measure by changing over calibration conditions based on conditions outside the preset types of sample container. Because of this, when a plurality of types of measurement are carried out using a related analysis apparatus, it is not possible to designate the most appropriate measuring conditions taking into account calibration of error factors other than the type of sample container and this becomes troublesome with regards to obtaining a highly precise measurement signal by carrying out measurements using average or typical calibration conditions.

SUMMARY OF THE INVENTION

An object of the invention is to provide an analysis apparatus capable of designating arbitrary calibration conditions for each measurement when a plurality of types of measurement are carried out using an autosampler.

An analysis apparatus of the present invention comprises a measurement head for measuring sample characteristics; storage means for storing calibration conditions made by performing device calibration in advance; measurement sequence data capable of setting calibration conditions used in each measurement step; designation means for designating calibration conditions for each measurement step of the measurement sequence data; and measurement control means for controlling a series of measurements in accordance with the measurement sequence data and for carrying out measurement after first setting calibration conditions designated for each measurement step at the measurement head when executing each measurement step.

BRIEF DESCRIPTION OF THE DRAWINGS

FIG. 2 is a schematic view of a measurement sequence of the embodiment of the present invention.

FIG. 3 is a flowchart of the operation of the embodiment of the present invention.

DETAILED DESCRIPTION OF THE INVENTION

Figure 1:
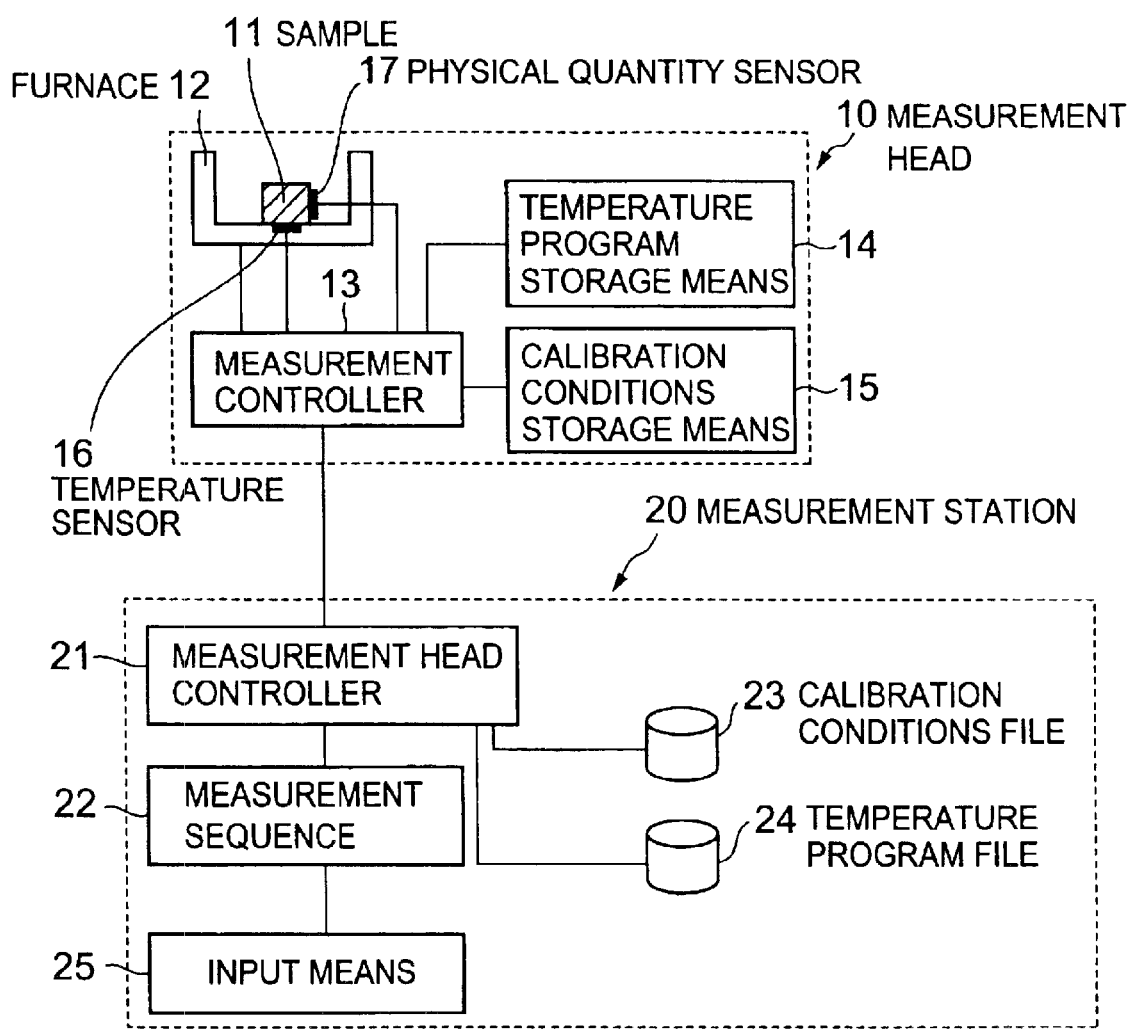
FIG. 1 is block diagram showing an embodiment of the present invention.

An embodiment of the present invention will be described in detail in the following based on the drawings. FIG. 1 is a block diagram of an example of the present invention implemented in a thermal analyzer. In the drawings, a measurement head 10 carries out actual measurements, with a measurement station 20 carrying out control of the measurement head 10 while conversing with an operator via a user interface, with the device as a whole therefore functioning as a thermal analyzer. The measurement head 10 comprises a sample. 11, furnace 12, measurement controller 13, temperature program storage means 14, calibration conditions storage means 15, temperature sensor 16, and physical quantity sensor 17. The sample 11 is inserted into a sample container and mounted in the furnace 12. The furnace 12 has a role of heating the sample 11 under the control of the measurement controller 13. The measurement controller 13 controls the furnace 12 according to a temperature program stored in the temperature program storage means 14. Calibration is then carried out for signals acquired from the temperature sensor 16 and the physical quantity sensor 17 using the calibration conditions stored in the calibration conditions storage means 15 and the results are sent to the measurement station 20 as thermal analysis data.

Upon receiving a new temperature program or calibration conditions from the measurement station 20, the measurement controller 13 installs the received new temperature program or calibration conditions in the temperature program storage means 14 or calibration conditions storage means 15 after discarding a temperature program stored currently in the temperature program storage means 14 or calibration conditions stored in the calibration conditions storage means 15.

The measurement station 20 comprises a measurement head controller a measurement sequence 22 containing measurement sequence data, a calibration conditions file 23, a temperature program file 24, and input means 25. The measurement sequence 22 is an arrangement for a measurement procedure for carrying out a plurality of measurements and is comprised of a plurality of measurement conditions and calibration conditions having an execution order. In the following, one measurement procedure within a measurement sequence is referred to as a measurement step.

An example of a measurement sequence is shown in FIG. 2. One measurement step comprises a measurement step number showing the order of execution, a measurement sample container number for identifying the measurement sample container, a reference sample container number for identifying a reference sample container, a temperature program file name and a calibration conditions file name. The usage of this measurement sequence is to control an autosampler in cases where an autosampler (not shown) is affixed to the measurement head 10 and set conditions for measuring a plurality of samples, and is preset with a series of measurement conditions to be carried out, for example, on a certain day, when an operator manually changes a sample to carry out measurements.

The calibration conditions file 23 is a file saved with calibration conditions obtained by carrying out device calibration in advance. The temperature program file 24 is a file for saving a temperature program for carrying out measurements.

The input means 25 is means for inputting the temperature program file name and the calibration conditions file name for each measurement step of the measurement sequence 22.

The measurement head controller 21 controls the measurement head 10 according to the measurement sequence 22 so as to execute a sequence of measurements. When an instruction to start execution is received from the operator, the measurement head controller 21 reads the measurement step for measurement step number (1) from the measurement sequence 22 and sends the temperature program (Temp Prog 1) and calibration conditions (Calib 1) designated by the file name to the measurement head 10. Further, when an autosampler (not shown) is added to the measurement head 10, an instruction set at the furnace for installing a sample container of a number designated for the autosampler is provided and when an autosampler is not added, an instruction to install a sample container of a number designated by an operator at the furnace 21 is outputted by the measurement head controller. When it is confirmed that the sample container is installed in the furnace 12, the measurement head controller 21 sends a measurement start instruction to the measurement head 10. When the measurement head 10 finishes measurement and the measurement step finishes, the next measurement step of the measurement sequence 22 is started. The measurement head 21 then carries out a similar operation for each measurement step until all of the measurement steps remaining in the measurement sequence 22 are executed.

The functions with which the measurement station 20 is equipped are implemented by a personal computer or workstation equipped with a user interface such as a keyboard and mouse and CRT etc. and software operating on the personal computer or workstation.

Next, a description is given of the operation of the thermal analyzer of the present invention based on the flowchart of FIG. 3.

In step S1, when a start instruction is received from an operator, the measurement station 20 starts to execute the measurement sequence 22.

In step S2, a measurement step number index i indicating the measurement step number of the next measurement step to be executed is initialized to 1.

In step S3, a determination is made as to whether or not a measurement step of the same measurement step number as i is present, and when this is not the case, step S11 is proceeded to and execution of the measurement sequence ends. When this is the case, step S4 is proceeded to.

In step S4, a sample container of the number designated by the measurement step is installed. When an autosampler (not shown) is added to the measurement head 10, installation of a sample container of the designated number is instructed to the autosampler, and when an autosampler is not added, an instruction to install a sample container of the designated number is outputted to an operator. When it is confirmed that installation of the sample container to the furnace is complete, step S4 ends and step S5 is proceeded to.

In step S5, a determination is made as to whether or not a calibration conditions file name is designated for this measurement step. When a calibration conditions file name is designated, step S6 is advanced to, and the contents of the designated calibration conditions file are sent to the measurement head 10. When the measurement head 10 receives calibration conditions, calibration conditions stored in the calibration conditions storage means 15 are discarded, and the new calibration conditions are stored in the calibration conditions storage means 15.

When a calibration conditions file name is not designated, the calibration conditions currently set in the calibration conditions storage means 15 continue to be used.

In step S7, the measurement station 20 reads a temperature program file designated in the measurement step and sends the temperature program to the measurement head 10. The measurement head 10 then discards the temperature program stored in the temperature program storage means 14 and loads the new temperature program into the temperature program storage means 14.

In step S8, the measurement station 20 outputs an instruction for starting measurement to the measurement head 10. When the measurement head 10 receives a measurement start instruction, running of the temperature program commences so that temperature control of the furnace is carried out, and after acquiring a signal from the temperature sensor 16 and the physical quantity sensor 17 and calibrating the signal using calibration conditions set in the calibration conditions storage means 15, measurement is executed by sending this data to the measurement station 20 as thermal analysis data.

When the temperature program ends and measurement is complete, in step S9, when an autosampler (not shown) is added to the measurement head 10, the measurement station 20 outputs an instruction to return the sample container to the original position with respect to the autosampler, and when an autosampler is not added, as the measurement is complete, a message is outputted to the operator to remove the sample container from the furnace 21.

In step S10, 1 is added to the value of the measurement step number index i.

Thereafter, a loop of step S3 to step S10 is repeated until measurements are taken for all of the measurement steps so that a determination is made in step S3 that there is no measurement step of measurement step number=i.

According to the analysis apparatus of the present invention described above, it is possible to use the most appropriate calibration conditions in line with measurement conditions as normal when a plurality of types of measurement are carried out consecutively. In particular, it is possible to obtain highly precise measurement results by making it possible to select calibration conditions that take into account error factors other than the type of sample container.

What is claimed is:

1. An analysis apparatus comprising:
   a measurement head for measuring characteristics of a sample;
   a calibration conditions file comprising at least one calibration condition obtained by carrying out device calibration for the measurement head in advance;
   designation means for designating one of the calibration conditions within the calibration conditions file;
   a measurement sequence data comprised of data representing a sequence of measurement steps comprising measurement conditions for carrying out measurements by the measurement head and the calibration conditions designated by the designation means; and
   measurement means for referring to each measurement step of the measurement sequence and carrying out measurement after inputting the measurement conditions and the calibration conditions for each measurement step to the measurement head.

2. An analysis apparatus according to claim 1; further comprising means for saving calibration conditions obtained by carrying out device calibration on the measurement head in advance as a file in the calibration conditions file and designating the calibration conditions used in each measurement step in the measurement sequence using a calibration conditions file name.

3. An analysis apparatus according to claim 1; wherein the analysis apparatus is a thermal analysis apparatus; and wherein the measurement head has a furnace for heating the sample and control means for measuring physical characteristics of the sample while varying the temperature of the furnace.

4. An analysis apparatus according to claim 2; wherein the analysis apparatus is a thermal analysis apparatus; and wherein the measurement head has a furnace for heating the sample and control means for measuring physical characteristics of the sample while varying the temperature of the furnace.

* * * * *